A. TREPREAU.
APPARATUS FOR HEATING WATER.
APPLICATION FILED FEB. 18, 1911.
1,009,354.
Patented Nov. 21, 1911.
2 SHEETS—SHEET 1.
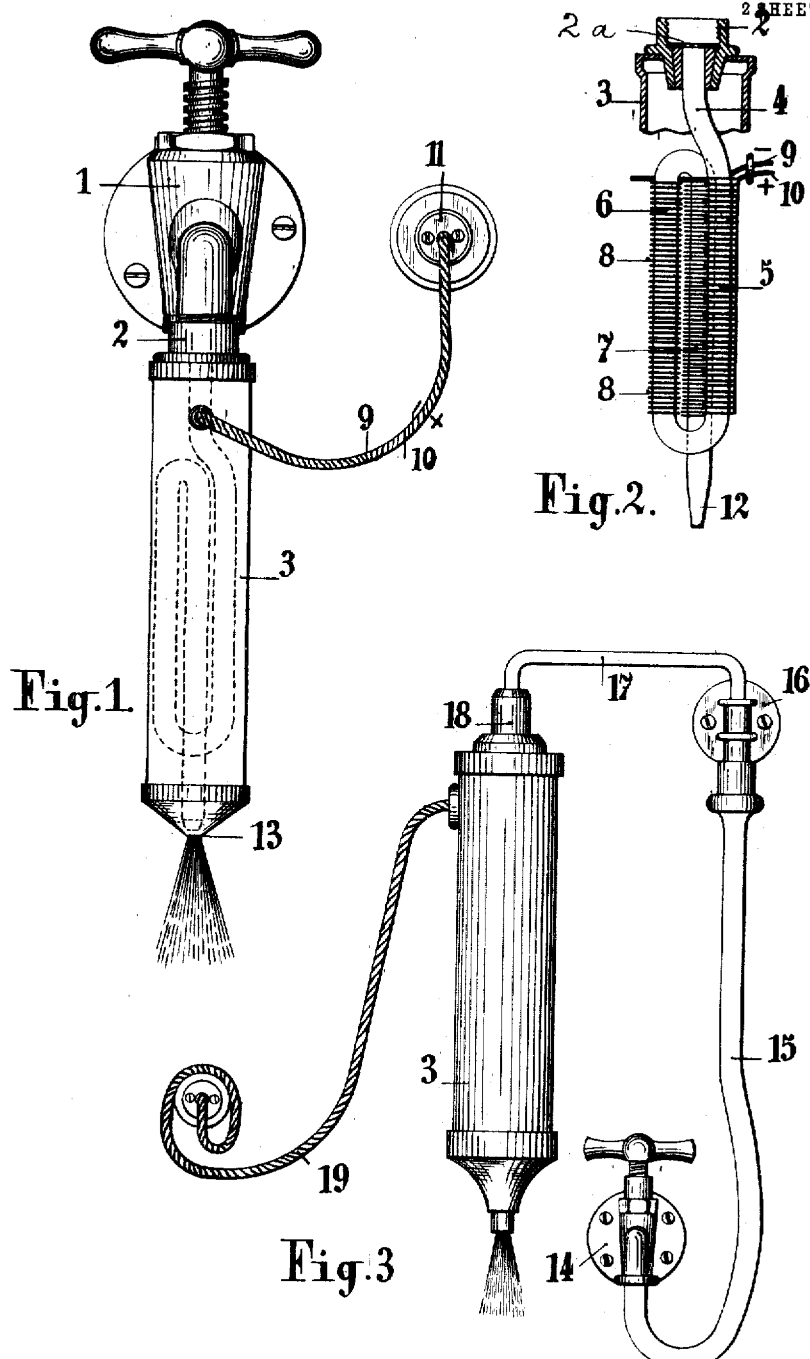
Witnesses:
Anton W. Selander.
[signature]
Inventor:
A. Trepreau
by F. Dittmar
Attorney.

A. TREPREAU.
APPARATUS FOR HEATING WATER.
APPLICATION FILED FEB. 18, 1911.
1,009,354.
Patented Nov. 21, 1911.
2 SHEETS—SHEET 2.
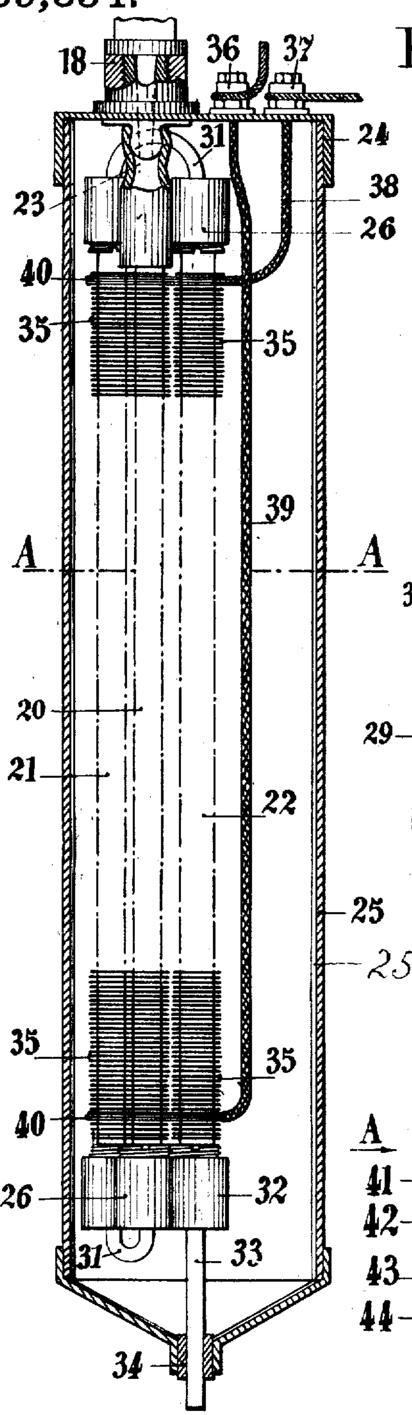
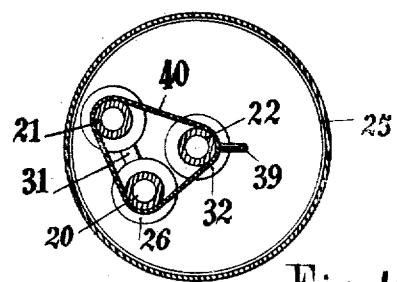
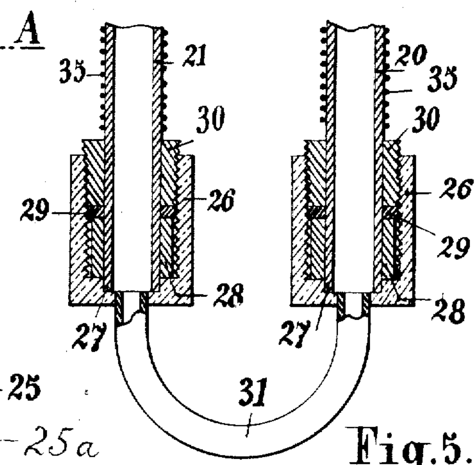
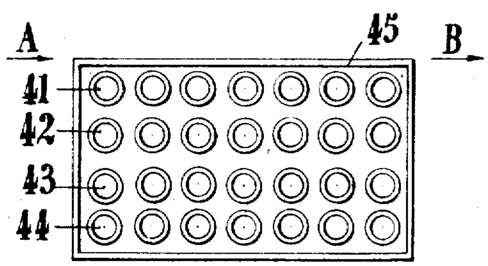
Fig. 6.
Witnesses:
Anton W. Selander.
C. D. Smith
Inventor:
A. Trepreau
by F. Dittmar
Attorney.

UNITED STATES PATENT OFFICE.

ALEXANDRE TREPREAU, OF JOINVILLE-LE-PONT, FRANCE.

APPARATUS FOR HEATING WATER.

1,009,354. Specification of Letters Patent. Patented Nov. 21, 1911.

Application filed February 18, 1911. Serial No. 609,411.

*To all whom it may concern:*

Be it known that I, ALEXANDRE TREPREAU, a citizen of the French Republic, residing at Joinville-le-Pont, in France, have invented certain new and useful Improvements in Apparatus for Heating Water, of which the following is a specification, reference being had therein to the accompanying drawing.

This invention has reference to an apparatus for heating water by means of an electric current which is branched for example from a lighting circuit, or from a special circuit. The current is utilized for heating metal resistances wound around one or more glass tubes through which the water to be heated is conducted.

The apparatus can be fitted to a common water tap by screwing or soldering it to the same, and as soon as the water is turned on, after having turned on the current, this water will be delivered at a temperature which can be regulated by varying the rate of delivery; the lower the rate at which the water is delivered the higher will be the temperature.

This heating apparatus can be employed for heating large quantities of water, for example for forming bath-geysers. In this case a great number of tubes will be provided and will be arranged in series or in parallel and the apparatus thus constructed will be neither expensive nor occupy much space.

I shall now describe my invention with reference to the accompanying drawings showing various forms of construction of the present invention, in which:

Figure 1 is an outside view of an apparatus fitted to an ordinary water tap. Fig. 2 is a detail view with parts in section, more particularly showing the repeatedly bent glass tube together with the mounting of the same, and the arrangement of the resistances. Fig. 3 shows a modification in the method of mounting the apparatus shown in Fig. 1. Fig. 4 is a section of a modified form of construction, in which the glass tubes are straight and are mounted in metal fittings. Fig. 4ª is a section on the line A—A of Fig. 4. Fig. 5 is an enlarged vertical section of the fitting 26, and its immediate connections. Fig. 6 is a diagrammatic view showing the method of mounting several rows of tubes grouped in series.

Referring first to Figs. 1 and 2, a metal tube 3 terminated at its end by a conical part is fitted by means of a connection 2 provided with a baffle plate 2ª, or the like for checking the current of the water to the water tap 1.

The heating element is formed from a glass tube 4 forming three branches 5, 6, 7 for example, around which are wound resistance wires 8, so as to form three circuits or branches of the main conductors 9, 10 connected to the switch 11.

The tube 4 is attached at its upper portion to the connection 2, and its third branch 7 terminates in a constricted portion 12 reaching to the center of the metal tube 3, slightly above the outlet 13, formed in the base of the conical part of the end of the said tube 3. In this condition the tap 1 is turned on and water passes through the tube 4, the resistance 8 being placed in circuit, and water will be obtained up to a temperature of about 90° centigrade with a current for example, of 4 amperes.

According to the method of construction shown in Fig. 3 the water tap 14 is joined to a connection 16 by a flexible tube 15. The tap 14 and the connection 16 are fitted to a wall, for example, and the bent tube 17 is mounted on the connection 16 and terminates at its other end in a head 18 to which is fitted the metal tube 3 containing the tubes and the heating element. The electric current is supplied through the wires 19. This arrangement is more particularly applicable for heating water for baths.

Figs. 4, 4ª and 5 show a modified form of construction referring to a special method of manufacturing and mounting the glass tubes. The latter are in this case present to the number of three, 20, 21 and 22 although there might also be five or more. These tubes are quite straight and are mounted in the following manner: The first tube 20 through which the water passes is connected by a flexible tube 23 to the connection shown at 18 in Fig. 3. This connection is mounted on the cap 24 which covers the upper part of the metal tube 25. At its lower portion this tube 20 is connected to the adjoining tube 21 by means of metal fittings 26. These metal fittings or cups are threaded at their interior, but at their lower portion are provided with a smooth recess 27 in which the glass tube engages. An india rubber ring 28 is arranged between the glass tube and the metal fitting 26, and is surmounted by a metal washer 29, which can be tightened up by screwing down the nut 30. This latter compresses the india rubber which firmly holds the glass tube and forms a safe tight joint. The first metal fitting or cup 26 is connected to the adjoining cup by means of a small curved copper tube 31. The two remaining tubes 21 and 22 are connected at their upper portion by similar fittings to the preceding one, and the tube 22 carries at its lower extremity a single metal fitting or cup 32 which is terminated by a straight tube 33, passing through the lower portion of the outer tube 25 the opening of which is provided with a fiber washer 34, thereby insulating the tube 33.

The tubes 20, 21 and 22 are provided with resistance wires 35, as described above, and the current conducting mains are attached to the binding posts 36 and 37, one of said mains having an extension 38 wrapped in asbestos, and the other an extension 39 also wrapped in asbestos. These two wires 38 and 39 are connected to current conducting sheaths 40 contacting with the wires 35. The heating portion is thus formed by all the tubes and the wires, and in order to insulate the wire from the metal casing 25, a suitable rolled sheet of asbestos 25[a] is arranged on the interior of the casing.

The feed water pressure is controlled or limited by tapering downwardly the water duct through the head 18 and is calculated so as to give a slightly greater supply than that required. It is this part which receives and checks any excessive pressure.

The above described arrangement of the glass tubes has the advantage of always leaving the apparatus full of water so that if a current is connected up before opening the tap the apparatus will not work uselessly.

Fig. 6 diagrammatically shows in section the arrangement of the tubes for an apparatus for supplying large quantities of water and intended to serve as a bath geyser. These tubes are present to the number of 28, and are arranged in four groups of seven mounted in series and indicated at 41, 42, 43 and 44. The inlet of water is effected for each group according to the arrow A and the outlet according to the arrow B. These series of tubes are grouped in a single apparatus 45 forming a casing. This casing is of rectangular or square shape, and occupies but little space, and the tubes are arranged and fed with current in any manner, and by means of any suitable fittings in accordance with the above principal indications, without thereby deviating from the principle of the invention. The principal advantage of these various apparatus are as follows:—Simplicity of mounting, easy exchanging of one of the elements or heating tubes, facility of grouping the tubes in series, in parallel, or in series-parallel, an apparatus occupying but little space, and capable of being employed for any quantities of hot water, without loss of heat by radiation, and serving for heating any liquids.

Having fully described my invention, what I claim as new, and desire to secure by Letters Patent is:—

1. An electric apparatus for heating water, comprising a cylinder, a head thereon adapted to be connected to a water tap and having a downwardly tapering duct, a plurality of non-conducting water tubes connected to form a continuous tube, resistance coils in circuit on said tubes and a flexible connection between said head and said tubes.

2. An electric apparatus for heating water, comprising a cylinder, water tubes having inlets and outlets therein, resistance coils in circuit on said tubes, inwardly threaded cup-like fittings to form seats for said tubes, elastic bands between said fittings and the lower ends of said tubes, washers on said tubes above said bands and outwardly threaded nuts to engage said fittings for the purpose stated.

In testimony whereof I affix my signature in the presence of two witnesses.

ALEXANDRE TREPREAU.

Witnesses:

VICTOR PREVOST,

DEAN B. MASON.